UNITED STATES PATENT OFFICE.

ALCIDE JOSEPH ROBERTS, OF BELLOWS FALLS, VERMONT.

PAINT.

1,177,357.  Specification of Letters Patent.  Patented Mar. 28, 1916.

No Drawing.   Application filed July 29, 1914.  Serial No. 853,937.

*To all whom it may concern:*

Be it known that I, ALCIDE JOSEPH ROBERTS, a citizen of the United States, residing at Bellows Falls, in the county of Windham and State of Vermont, have invented a certain new and useful Improvement in Paints, of which the following is a full, clear, and exact description.

The object of this invention is to provide a cold water paste paint, that is capable of use for weather-proofing or water-proofing structures.

The invention consists in a composition made from water, raw linseed oil, troy gum, alum, clay and zinc oxid or other body-forming substances, potassium carbonate or other substance which will incorporate the oil, sodium chlorid or other preservative, and crude glycerin or other preventive of too rapid drying, or some of these substances as conditions may require, prepared and mixed as hereinafter explained and finally claimed. This substance, "troy gum", is a commercial article, of starchy nature, and so far as I can ascertain is a hydrolized starch product.

In the following description the terms "part" or "parts" relate to weight.

One part of troy gum is dissolved in eight parts of lukewarm water, thoroughly mixed so as to avoid the formation of lumps, boiled, and the solution then allowed to cool. This preparation is herein referred to as the "solution".

To prepare a weather-proof paint, there are incorporated in one hundred and twenty-five parts of the solution one hundred and seventy-five parts of clay, and twenty-five parts of zinc oxid or other equivalent powdered or otherwise finely-divided body-forming materials, and these ingredients are thoroughly mixed in an ordinary or suitable mixer. If after thorough mixing the composition is of the consistence of jelly, then two parts of alum dissolved in three parts of water are added, and for a preservative three parts of common salt or its equivalent. If the composition should dry too rapidly any suitable retarder may be added, and it is found that crude glycerin in the proportion of three per cent. of the mass, is useful.

For a water-proof paint, there is added to the foregoing mixture twenty-five parts of raw linseed oil and thoroughly mixed. The addition of three parts of potassium carbonate or equivalent alkaline matter dissolved in six parts of water, will facilitate the incorporation of the oil in the composition.

The product is an excellent cold water paste paint, suitable for both indoor and outdoor work, of durable quality, easily worked, and comparatively inexpensive.

What I claim is:—

1. A paint composition, consisting of the reaction products of substances including water, a starch product, an anti-jellying ingredient, powdered body-forming material, and a preservative, substantially in the proportions described.

2. A paint composition, consisting of the reaction products of substances including water, troy gum, alum, body-forming material, and a preservative, substantially in the proportions described.

3. A paint composition, consisting of the reaction products of substances including water, troy gum, alum, body-forming material, a preservative, and a drying retarder, substantially in the proportions described.

4. A paint composition, consisting of the reaction products of substances including water, troy gum, alum, body-forming material, a preservative, a drying retarder, and raw linseed oil, substantially in the proportions described.

5. A paint composition, consisting of the reaction products of substances including water, troy gum, alum, body-forming material, a preservative, a drying retarder, raw linseed oil, and potassium carbonate, substantially in the proportions described.

6. A weather-proof paint, consisting of the reaction products of substances including water, troy gum, clay, zinc oxid, alum, common salt, and a drying retarder, substantially in the proportions described.

7. A waterproof paint, consisting of the reaction products of substances including water, troy gum, clay, zinc oxid, alum, common salt, a drying retarder, linseed oil, and potassium carbonate, substantially in the proportions described.

In testimony whereof I have hereunto set my hand this 25th day of July, A. D. 1914.

ALCIDE JOSEPH ROBERTS.

Witnesses:
 BLANCHE WOODFALL,
 HENRY M. GRAHAM.